United States Patent
Schulkes et al.

(10) Patent No.: US 12,138,908 B2
(45) Date of Patent: Nov. 12, 2024

(54) BELT SUPPORT STRUCTURE FOR A CONVEYOR OF AN INKJET PRINTER

(71) Applicant: Canon Production Printing Holding B.V., Venlo (NL)

(72) Inventors: Joseph A. Schulkes, Venlo (NL); Mark Rietbergen, Venlo (NL); Roy H. R. Jacobs, Venlo (NL)

(73) Assignee: CANON PRODUCTION PRINTING HOLDING B.V., Venlo (NL)

(*) Notice: Subject to any disclaimer, the term of this patent is extended or adjusted under 35 U.S.C. 154(b) by 244 days.

(21) Appl. No.: 17/663,380

(22) Filed: May 13, 2022

(65) Prior Publication Data
US 2022/0379630 A1    Dec. 1, 2022

(30) Foreign Application Priority Data
May 26, 2021   (EP) .................................... 21175924

(51) Int. Cl.
| | |
|---|---|
| *B65H 29/24* | (2006.01) |
| *B41J 11/00* | (2006.01) |
| *B65G 15/32* | (2006.01) |
| *B65G 15/60* | (2006.01) |
| *B65G 21/10* | (2006.01) |
| *B65G 21/20* | (2006.01) |

(52) U.S. Cl.
CPC ............. *B41J 11/007* (2013.01); *B65G 15/32* (2013.01); *B65G 15/60* (2013.01); *B65G 21/10* (2013.01); *B65G 21/2027* (2013.01); *B65H 29/242* (2013.01); *B65H 2404/27* (2013.01); *B65H 2404/281* (2013.01); *B65H 2801/03* (2013.01)

(58) Field of Classification Search
CPC . B65H 29/242; B65H 2404/281; B41J 11/007
See application file for complete search history.

(56) References Cited

U.S. PATENT DOCUMENTS

| | | | | |
|---|---|---|---|---|
| 6,051,095 A | * | 4/2000 | Butterworth | ....... B65H 19/1873 156/286 |
| 11,027,562 B2 | * | 6/2021 | Herrmann | .............. B41J 11/007 |

(Continued)

FOREIGN PATENT DOCUMENTS

| | | |
|---|---|---|
| CN | 202556927 U | 11/2012 |
| CN | 105150696 B | 1/2018 |
| JP | 2016-150792 A | 8/2016 |

OTHER PUBLICATIONS

European Search Report, issued in Application No. 21 17 5924, dated Nov. 9, 2021.

*Primary Examiner* — Howard J Sanders
(74) *Attorney, Agent, or Firm* — Birch, Stewart, Kolasch & Birch, LLP

(57) ABSTRACT

A low cost and low air resistance belt support structure for an endless belt conveyor of an inkjet printer can be achieved with the belt support structure being provided over a suction chamber. The belt support structure includes a plurality of longitudinal, narrow support beams positioned spaced apart from one another and parallel to one another in a transport direction of the belt to define a flat support plane for the belt. The support beams provides a relatively small contact area with the belt, which results in low friction. The support beams further allow for a relatively large open area between them to achieve a low air resistance.

15 Claims, 2 Drawing Sheets

(56) References Cited

U.S. PATENT DOCUMENTS

| | | |
|---|---|---|
| 2005/0139054 A1 | 6/2005 | Markowitz |
| 2011/0293346 A1 | 12/2011 | Sato |
| 2012/0069085 A1 | 3/2012 | Yamagishi et al. |
| 2016/0200121 A1 | 7/2016 | Watanabe et al. |
| 2017/0239959 A1 | 8/2017 | Estruch et al. |

\* cited by examiner

BELT SUPPORT STRUCTURE FOR A CONVEYOR OF AN INKJET PRINTER

BACKGROUND OF THE INVENTION

1. Field of the Invention

The invention relates to a conveyor for an inkjet printer, an inkjet printer comprising such a conveyor, and to a tile element for forming a belt support structure in such a conveyor.

2. Description of Background Art

It is known to apply an endless conveyor belt as a sheet support surface facing a print head assembly in an inkjet printer. The sheet is drawn against the belt by means of an underpressure applied via through-holes in the belt. In case of a pagewide print head assembly the sheet may be printed without stopping, resulting in a productive printer. To maintain the support surface flat and level, a belt support structure is provided below the belt to prevent the belt from deforming under the applied underpressure. It is known to construct such belt support structure from metal plates by e.g. milling the plate, for example as known from US2012069085, US2016200121, US2017239959, or US2011293346. The known plates however provide a relatively high load on the motor for driving the belt, as well issues with contamination spreading between the belt and plates.

SUMMARY OF THE INVENTION

It is an object of the invention to provide an alternative belt support structure for an endless, air permeable belt in a conveyor of an inkjet printer, preferably with a reduction in manufacturing and/or operational costs, and/or contamination issues. In accordance with the present invention, a conveyor according to claim 1, an inkjet printer according to claim 14, and a tile element according to claim 15 are provided. Said conveyor comprises an endless, air permeable belt positioned at least partially over a suction chamber, wherein a belt support structure is provided over the suction chamber, wherein the belt support structure comprises a plurality of longitudinal, narrow support beams positioned spaced apart from one another and parallel to one another in a transport direction of the belt to define a flat support plane for the belt.

The support surface which contacts the belt is formed of narrow support beams, specifically the top portion of said support beams during use. The contact area between the belt and the support beams is thereby relatively small, which reduces friction between the belt and the belt support structure. The support beams further are aligned parallel to the transport direction, which further results in a low friction support surface. The support beams form a simple belt support structure, which is easy to manufacture by low costs methods, such as injection molding. Additionally, the contact area between the belt and the belt support structure is small, while a relatively large open area of the belt support structure may be achieved. This allows for an effective removal of contaminants, such as ink particles floating between the belt and the print head assembly, through the belt and the belt support structure towards the suction source. Contamination is thereby reduced, while the relatively small contact area of the support beams is easy to clean.

Thereby the object of the present invention has been achieved.

More specific optional features of the invention are indicated in the dependent claims.

In an embodiment, the belt support structure further comprises spaced apart connection bridges for connecting support beams to one another, which connection bridges extend perpendicular to the support beams in a lateral direction of the belt, which connection bridges are positioned remote from the support plane. The connection bridges join support beams together. This results in an easy to handle and mount structure. The connection bridges are positioned below the support plane during operation, such that the connection bridges to exert additional friction on the belt. Also any contamination on the connection bridges will then not directly spread to the belt.

In an embodiment, an opening is formed between neighboring support beams and neighboring connection bridges, wherein a combined area of the openings exceed a combined area of the support beams and the connection bridges, when viewed perpendicular to the support plane. The belt support structure has a relatively large open area for allowing air to pass through into the underlying suction chamber. In between connection bridges and support beams openings are present in the belt support structure. The support beams and the connection bridges are dimensioned and positioned with respect to one another such that their total area projected onto the suction chamber, when viewed in a top-down direction, is smaller than a total area of the suction chamber not covered by the belt support structure. This results in a low friction support surface with a relatively low air resistance, and in consequence a high throughflow of air through the belt and the belt support structure. This improves the holding down of the sheet onto the belt as well as the removal of airborne particles above the belt via the belt support structure.

In an embodiment, a length and/or width of the opening in the transport direction and/or the lateral direction exceeds a width of the connection bridges. The distance between neighboring connection bridges is greater than a width of an individual connection bridges, when measured in the transport direction. This results in relatively large open area and low air resistance of the belt support structure. Preferably, the length and/or width of the opening in the transport direction and/or the lateral direction is at least three times, preferably at least four times, very preferably at least five times the width of the connection bridges. Any representative distance, length, and/or width may be used, such as an average distance, length, or width, or the smallest distance, length, or width of a connection bridge and/or opening in the belt support structure. The distance between neighboring connection bridges is a plurality of the width of an individual connection bridge, the plurality being at least 2, 3, 4, or 5 times said width. The connection bridges are preferably positioned equidistanced with respect to their nearest neighbors, for example in their entirety or in smaller groups with different spacings. Similarly, the width of the connection bridges may be the same for all connection bridges, or at least for groups of connection bridges. In another embodiment, the connection bridges are oriented in the lateral direction. The connection bridges extend between adjacent support beams via the shortest intermediate distance. This further minimizes the total area of the belt support structure.

In an embodiment, a length and/or width of the opening in the transport direction and/or the lateral direction exceeds a width of the support beams, preferably wherein the length and/or width of the opening in the transport direction and/or the lateral direction is at least two times, preferably at least three times, very preferably at least four times the width of the connection bridges.

In an embodiment the belt support structure is formed of a plurality of identical tile elements, each tile element comprising a plurality of connection bridges and support beams. Each tile element is formed of a group of support beams connected together via connection bridges to form a single element or structure. This allows the belt support structure to be formed with a plurality of identical, easy to handle tile elements, thereby simplifying the construction of the belt support structure. The costs of the belt support structure are further reduced, since such tile elements may be produced in bulk by low costs manufacturing methods such as injection molding. Preferably, the belt support structure is formed of multiple, identical tile elements. In another embodiment, the tile elements are provided with corresponding locking means for interlocking the tile elements to one another. The tile elements are locked or secured together by corresponding locking means, such as a click-and-lock mechanism. This allows for quick assembly of the belt support structure.

In an embodiment, the suction chamber is provided with a plurality of rods extending parallel to the support plane, wherein the tile elements are provided with attachment means for attaching the tile elements on the rods. The rods provide a support for mounting the tile elements and provide rigidity to the belt support structure. This allows the tile elements to be formed of a relatively low costs material, such as plastic. The rods are preferably formed of a different material than the tile element. Metal rods may for example be used to provide a rigid base for mounting the tile elements. This reduces the requirements on the material for the tile element, allowing said material to be optimized with regard to e.g. the production process, costs, and the interaction between said material and the belt (friction) and/or between the material and any known contaminants, such as ink or related particles. Preferably, the rods are identical or similar and positioned spaced apart from one another.

In an embodiment, the support beams and preferably the connection bridges are formed of a plastic material, preferably of an injection molded plastic material, and very preferably of a plastic material comprising polytetrafluoroethylene (PTFE) and a glass fiber material. Plastic is low costs and was found to provide a low friction interface with the belt. Specifically a mixture comprising polytetrafluoroethylene (PTFE) and a glass fiber material was found to result in a low coefficient of friction under operational conditions in the printer. A material comprising PTFE with a glass fiber material resulted in a coefficient of friction less than 0.3 even with contaminations on the belt and/or belt support structure. Typical contaminations include ink, specifically latex-based ink and/or a primer suitable for such an ink. A preferred material is for example Teflon combined or filled with Barium Sulphate ($BaSO_4$) and/or a polyoxymethylene (POM) material or composite material, either with or without additions. The applied material may further be tribologically optimized to minimize friction and/or pollution.

In another embodiment, the belt is formed of a perforated plastic material, preferably comprising polyethylene terephthalate (PET). The above mentioned materials were found to give low coefficients of friction in combination with a plastic belt, specifically one comprising PET. A plastic belt further reduces the costs of the conveyor.

In an embodiment, the suction chamber is positioned between a plurality of rollers for supporting and driving the belt, such that the belt surrounds the suction chamber. The belt extends circumferentially around the suction chamber to achieve a compact design.

The present invention further relates to an inkjet printer comprising a conveyor according to the present invention. The inkjet printer is preferably a sheet printer, suitable for mid- to large volume printing.

The present invention further relates to a tile element for forming a belt support structure of an endless belt conveyor for an inkjet printer, the tile element comprising a plurality of longitudinal, narrow support beams positioned parallel to one another in a first direction to define a flat support plane for the belt and spaced apart connection bridges for connecting support beams to one another, which connection bridges extend perpendicular to the support beams in a second direction perpendicular to the first direction, which connection bridges are positioned remote from the support plane, and wherein the tile element is formed of a plastic material, preferably of an injection molded plastic material, and very preferably of a plastic material comprising polytetrafluoroethylene (PTFE) and a glass fiber material. The tile element is low costs and easy to assembly into the print belt support structure.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
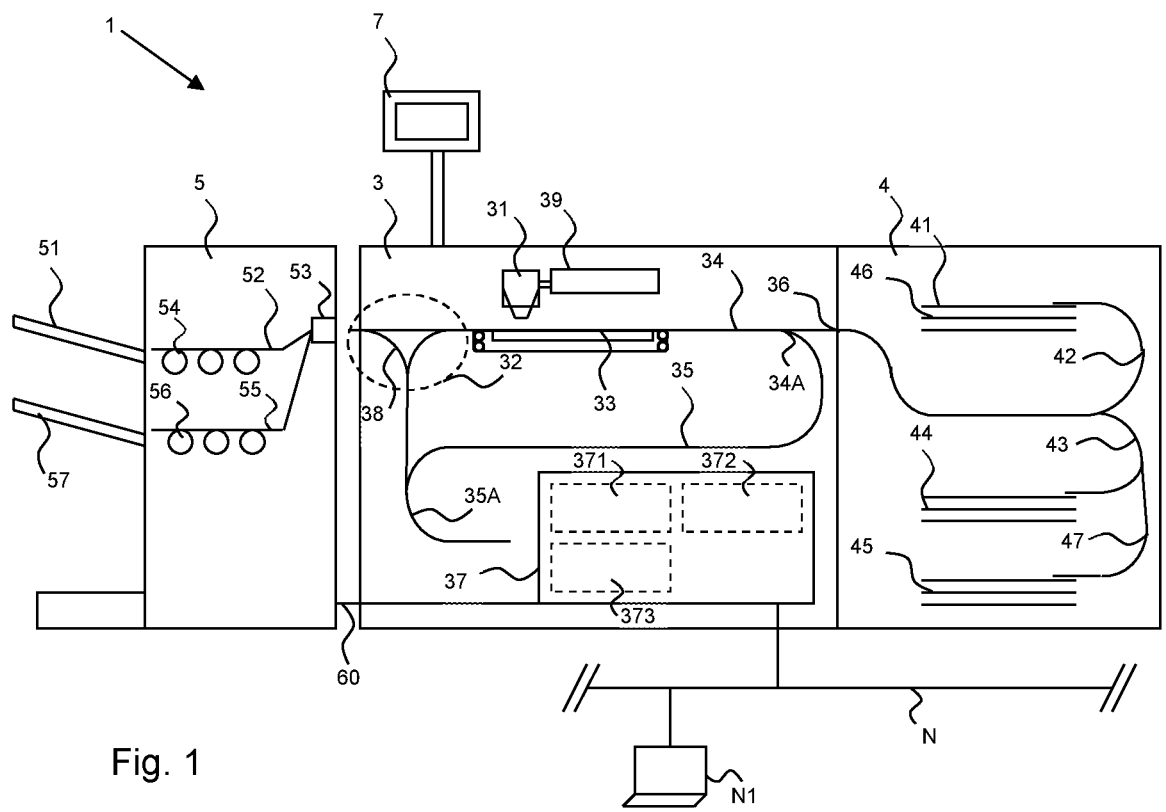
FIG. 1 is a schematic cross-sectional view of a printer according to the present invention comprising a conveyor with an endless belt.

The present invention will now be described with reference to the accompanying drawings, wherein the same reference numerals have been used to identify the same or similar elements throughout the several views.

FIG. 1 shows schematically an embodiment of a printer 1 according to the present invention. The printer 1, for purposes of explanation, is divided into an output section 5, a print engine and control section 3, a local user interface 7 and an input section 4. While a specific printer is shown and described, the disclosed embodiments may be used with other types of printer such as an ink jet print system, an electrographic print system, etc.

The output section 5 comprises a first output holder 52 for holding printed image receiving material, for example a plurality of sheets. The output section 5 may comprise a second output holder 55. While 2 output holders are illustrated in FIG. 1, the number of output holders may include one, two, three or more output holders. The printed image receiving material is transported from the print engine and control section 3 via an inlet 53 to the output section 5.

When a stack ejection command is invoked by the controller 37 for the first output holder 52, first guiding means 54 are activated in order to eject the plurality of sheets in the first output holder 52 outwards to a first external output holder 51. When a stack ejection command is invoked by the controller 37 for the second output holder 55, second guiding means 56 are activated in order to eject the plurality of sheets in the second output holder 55 outwards to a second external output holder 57.

The output section 5 is digitally connected by means of a cable 60 to the print engine and control section 3 for bi-directional data signal transfer.

The print engine and control section 3 comprises a print engine and a controller 37 for controlling the printing process and scheduling the plurality of sheets in a printing order before they are separated from input holder 44, 45, 46.

The controller 37 is a computer, a server or a workstation, connected to the print engine and connected to the digital environment of the printer, for example a network N for transmitting a submitted print job to the printer 1. In FIG. 1 the controller 37 is positioned inside the print engine and control section 3, but the controller 37 may also be at least partially positioned outside the print engine and control section 3 in connection with the network N in a workstation N1.

The controller 37 comprises a print job receiving section 371 permitting a user to submit a print job to the printer 1, the print job comprising image data to be printed and a plurality of print job settings. The controller 37 comprises a print job queue section 372 comprising a print job queue for print jobs submitted to the printer 1 and scheduled to be printed. The controller 37 comprises a sheet scheduling section 373 for determining for each of the plurality of sheets of the print jobs in the print job queue an entrance time in the paper path of the print engine and control section 3, especially an entrance time for the first pass and an entrance time for the second pass in the loop in the paper path according to the present invention. The sheet scheduling section 373 will also be called scheduler 373 hereinafter.

The sheet scheduling section 373 takes the length of the loop into account. The length of the loop corresponds to a loop time duration of a sheet going through the loop dependent on the velocity of the sheets in the loop. The loop time duration may vary per kind of sheet, i.e. a sheet with different media properties.

Resources may be recording material located in the input section 4, marking material located in a reservoir 39 near or in the print head or print assembly 31 of the print engine, or finishing material located near the print head or print assembly 31 of the print engine or located in the output section 5 (not shown).

The paper path comprises a plurality of paper path sections 32, 33, 34, 35 for transporting the image receiving material from an entry point 36 of the print engine and control section 3 along the print head or print assembly 31 to the inlet 53 of the output section 5. The paper path sections 32, 33, 34, 35 form a loop according to the present invention. The loop enables the printing of a duplex print job and/or a mix-plex job, i.e. a print job comprising a mix of sheets intended to be printed partially in a simplex mode and partially in a duplex mode.

The print head or print assembly 31 is suitable for ejecting and/or fixing marking material to image receiving material. The print head or print assembly 31 is positioned near the paper path section 34. The print head or print assembly 31 may be an inkjet print head, a direct imaging toner assembly or an indirect imaging toner assembly.

While an image receiving material is transported along the paper path section 34 in a first pass in the loop, the image receiving material receives the marking material through the print head or print assembly 31. A next paper path section 32 is a flip unit 32 for selecting a different subsequent paper path for simplex or duplex printing of the image receiving material. The flip unit 32 may be also used to flip a sheet of image receiving material after printing in simplex mode before the sheet leaves the print engine and control section 3 via a curved section 38 of the flip unit 32 and via the inlet 53 to the output section 5. The curved section 38 of the flip unit 32 may not be present and the turning of a simplex page has to be done via another paper path section 35.

In case of duplex printing on a sheet or when the curved section 38 is not present, the sheet is transported along the loop via paper path section 35A in order to turn the sheet for enabling printing on the other side of the sheet. The sheet is transported along the paper path section 35 until it reaches a merging point 34A at which sheets entering the paper path section 34 from the entry point 36 interweave with the sheets coming from the paper path section 35. The sheets entering the paper path section 34 from the entry point 36 are starting their first pass along the print head or print assembly 31 in the loop. The sheets coming from the paper path section 35 are starting their second pass along the print head or print assembly 31 in the loop. When a sheet has passed the print head or print assembly 31 for the second time in the second pass, the sheet is transported to the inlet 53 of the output section 5.

The input section 4 may comprise at least one input holder 44, 45, 46 for holding the image receiving material before transporting the sheets of image receiving material to the print engine and control section 3. Sheets of image receiving material are separated from the input holders 44, 45, 46 and guided from the input holders 44, 45, 46 by guiding means 42, 43, 47 to an outlet 36 for entrance in the print engine and control section 3. Each input holder 44, 45, 46 may be used for holding a different kind of image receiving material, i.e. sheets having different media properties. While 3 input holders are illustrated in FIG. 1, the number of input holders may include one, two, three or more input holders.

The local user interface 7 is suitable for displaying user interface windows for controlling the print job queue residing in the controller 37. In another embodiment a computer N1 in the network N has a user interface for displaying and controlling the print job queue of the printer 1.

Figure 2:
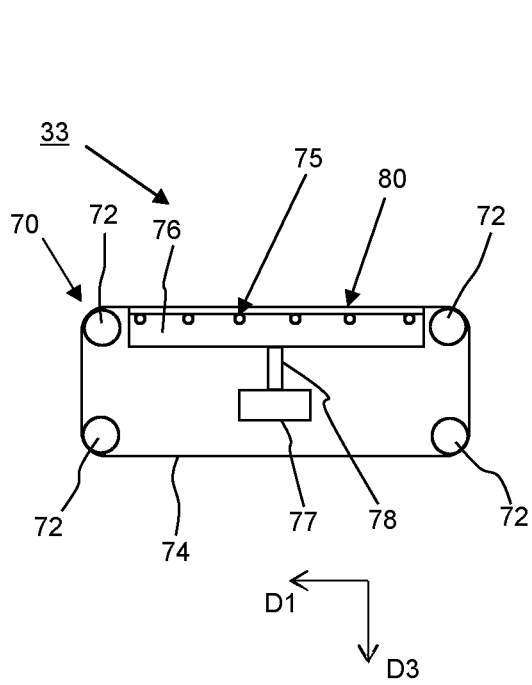
FIG. 2 is a schematic cross-sectional view of the conveyor in FIG. 1.

FIG. 2 shows a schematic cross-sectional view of a conveyor 70 positioned at the paper path section 33. The conveyor 70 comprises a plurality of rollers 72 which support and drive an endless conveyor belt 74. At least of the rollers 72 is provided with a drive or motor for driving the belt 74. The belt 74 is permeable to gas, specifically to air, to apply an underpressure to a sheet of an image receiving member positioned on the belt 74. The sheet is thereby held in position against the belt 74. The holding force applied by the underpressure should be sufficient to prevent displacement of the sheet with respect top the belt 74. Generally, the belt 74 is or has been aligned with respect to the print head assembly 31. Any displacement of the sheet with respect to the belt 74 could result in print errors or artifacts in the image printed on the sheet by incorrectly positioned ink droplets. In the embodiment shown in FIG. 2, the belt 74 is formed of plastic to reduce the costs of such a belt 74, preferably a plastic partially or entirely formed of polyethylene terephthalate (PET). The belt 74 is provided with a matrix of through-holes to draw in air through the belt 74. The belt 74 is positioned above a suction chamber 76 which is connected to a suction source 77, such as a pump or fan, via line 78. It will appreciated that the suction source 77 may be positioned remote from the suction chamber 76 by extending the line 78. To achieve good image quality the sheet should be flatly positioned below the print head assembly 31. This prevents any irregularities in the sheet from resulting in print artifacts. It further allows for a narrow print gap between the print head assembly 31 and the sheet, which allows for more accurate ink droplet positioning. To maintain the sheet in a planar state, a belt support structure 80 provided at the top side of the suction chamber 76 in contact with an inward facing portion of the belt 74. Belt support structure 80 preferably extends along the full width and length of the suction chamber 76. In FIG. 2 the belt support structure 80 is mounted on the walls of the suction chamber 76 by means of the mounting elements 75, which in FIG. 2 are illustrated as rods. The belt support structure 80 and/or the mounting elements 75 are positioned at or near the top of the suction chamber 76. The belt support structure 80 and/or the mounting elements 75 are at a distance from a bottom surface of the suction chamber 76. Thus an open area with low air resistance is present in the lower part of the suction chamber 76, allowing for an efficient distribution of the underpressure throughout the suction chamber 76.

Figure 3:
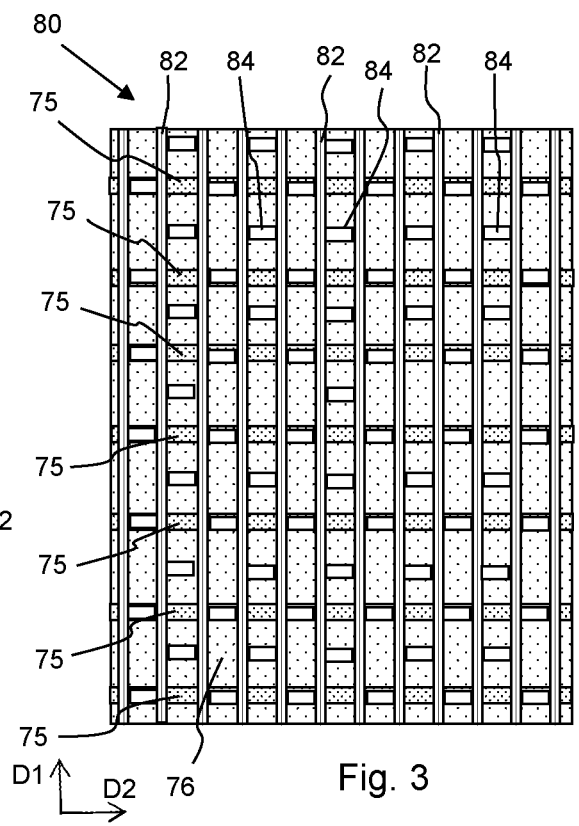
FIG. 3 is a schematic top-down view of an embodiment of a belt support structure for the conveyor in FIGS. 1 and 2.

FIG. 3 shows a schematic top-down view of the belt support structure 80 on the suction chamber 76. A plurality of longitudinal support beams 82 extend parallel to one another in the transport direction D1 of the conveyor 70, which coincides with the circumferential direction of the belt 74 below the print head assembly 31 during operation. The top edges of the support beams 72 together define a support plane for the belt 74. The support beams 72 are dimensioned and positioned such that the support plane is planar or flat. In FIGS. 2 and 3 the support beams are provided as identical narrow beams, which are aligned in the transport direction D1. The contact surface with the belt 74 is thereby minimized, resulting in minimal friction between the belt 74 and the support beams 82. The support beams 82 are positioned spaced apart from one another in a lateral direction D2 of the suction chamber 76. The distance between neighbouring support beams 82 is at least a plurality of the width of the support beams 82 in the lateral direction D2. This results in an open belt support structure 80 with low air resistance. This reduces the load on the suction source 77. It further aids in preventing a build-up of so-called ink mist, which is fine droplets of ink floating below the print head assembly 31 by removing these particles by suction towards a filter (not shown) which removes the particles from the air passing through it. Specifically, ink mist build-up below the belt is reduced or prevented, which allows the belt support structure 80 and the belt 74 to avoid blockage and maintain their open structure during continued operation. Thereby contamination of the belt 74 or the sheet is reduced.

The support beams 82 are connected to one another via connection bridges 84. The connection bridges 84 extend in FIG. 3 in the lateral direction D2 between neighbouring support beams 82. The connection bridges 84 are preferably aligned in the lateral direction D2, such the total area of the connection bridges 84 is minimized. The connection bridges 84 are positioned out of the support plane formed by the support beams 82. During operation the connection bridges 84 are positioned below the support plane and thus below the belt 74. The connection bridges 84 provide an easy mounting of the belt support structure 80 on the suction chamber 76. The connection bridges 84 further maintain the support beams 82 aligned in the transport direction D1. The connection bridges 84 in FIG. 3 are relatively narrow compared to their intermediate distance in the transport direction D1. The distance between adjacent connection bridges 84 in the transport direction D1 is at least a plurality of the width of a single connection bridge 84. This results in an open belt support structure 80, wherein the total area of the support beams 82 and the connection bridges 84 viewed in the top-down direction D3 is less than the uncovered area of the top opening of the suction chamber 76. Preferably, total surface of the support beams 82 and the connection bridges 84 is less than half, very preferably less than one-third, and even more preferably less than one-quarter of the total area of the top opening of the suction chamber 76. The connection bridges 84 are mounted on mounting rods 75 which extends across the suction chamber 76. In another embodiment, the connection bridges 84 may be formed by such mounting rods or beams 75 by mounting the support beams 82 on the mounting rods 75, either directly via attachments means, such as hooks, clamps, glue, etc. or indirectly via the connection bridges 84. The supports rods 75 may be mounted on the walls of the suction chamber 76 by any suitable means, such as bearings, recesses, support strips, etc. It will be appreciated that a different support for the support beams 82 may be applied. The support beams 82 are supported such that these provide a flat or planar belt support plane. Other suitable supports may be plates, beams, wire meshes, etc. The support may further be integrated into the support beams 82 and/or connection bridges 84, such that these are mounted directly on the suction chamber 76.

Figure 4:
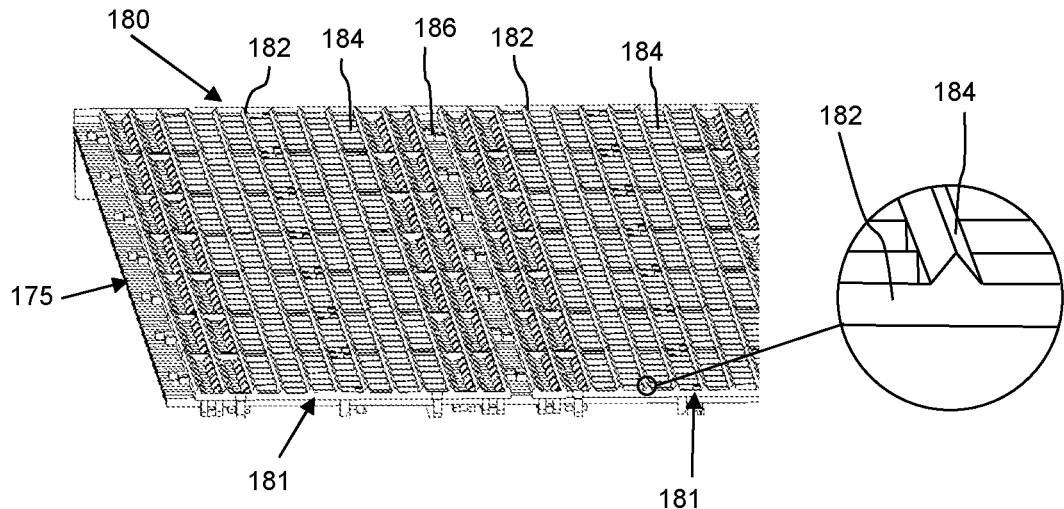
FIG. 4 is a perspective view of another embodiment of a belt support structure for the conveyor in FIGS. 1 and 2.

FIG. 4 illustrates a perspective view of another embodiment of a belt support structure 180. In FIG. 4 the belt support structure 180 is formed of a plurality of identical tile elements 181, which are arranged in a pattern or matrix. Each tile element 181 comprises a plurality of support beams 182, which are connected to one another by means of the connection bridges 184, similar to the embodiment in FIG. 3. The tile elements 181 are connected to one another via locking means or elements 186. Each locking element 186 is shaped to lockingly join with a corresponding locking element 186 on the neighboring side of an adjacent tile element 181 to secure neighboring tile elements 181 together. The locking elements 186 may for example be a click mechanism, which allow for fast assembly of the belt support structure 180. The tile elements 181 are further secured to the mounting rods 175. The mounting rods 175 are formed of a different material than the tile elements 181, preferably of a material with greater rigidity than that of the tile elements 181. The mounting rods 175 may for example be formed of metal or other suitable rigid material, which allows the tile elements 181 to be formed of a weaker material but with suitable properties for achieving e.g. low friction with the belt 74, specifically in the presence of ink or primer contamination. The tile element 181 may be formed of e.g. injection molded plastic, preferably a plastic material comprising polytetrafluoroethylene (PTFE) and a glass fiber material. The latter provides low friction between the belt 74 and the support beams 182, even when ink or primer has contaminated the interface between the two. The belt 74 is preferably formed of a plastic, for example partially or entirely consisting of PET. Low friction between these two materials under operational conditions was achieved during testing.

The mounting rods 175 provide rigidity to the belt support structure 180, which prevents the belt support structure 180 from deforming under the suction forces applied to a sheet on the belt 74 over the belt support structure 180. This allows the tile elements 181 to produce by low-costs methods, such as injection molding. It will be appreciated that within the present invention, the connection bridges 182 may alternatively be configured in a sufficiently rigid manner, such that the connection bridges 182 may act as the means for mounting the belt support structure 180 on the suction chamber. Each tile element 181 with its support beams 182, connection bridges 184, and optionally its locking means 186, is integrally formed. The support beams 182, connection bridges 184, locking means 186, and/or means for mounting the tile element 181 on the mounting rods 175 are preferably formed in a single mold and of the same material.

As shown in FIG. 4, the support beams 182 taper towards the support plane in the top-down direction D3. The cross-section of the support beams 182 narrows towards to the support plane. In consequence the contact area between the support beams 182 is minimized, which results in low friction on the belt 74. The tapering allows the support beams 182 to have a wider base to reinforce their rigidity, which contributes to easier handling during manufacturing.

Figure 5:
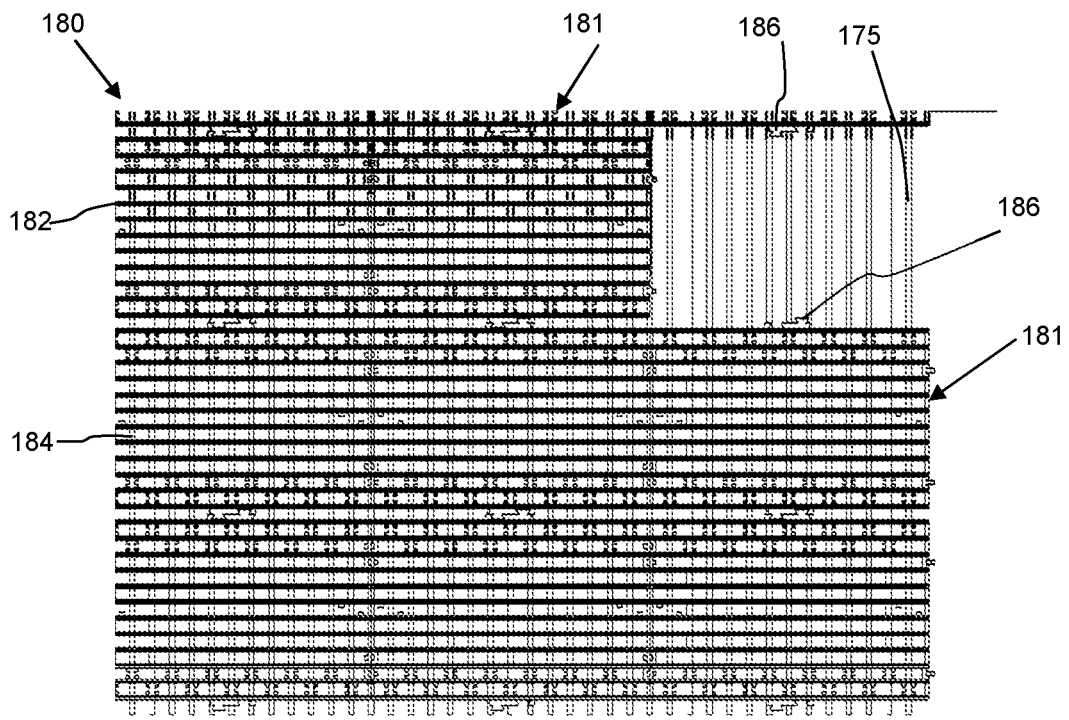
FIG. 5 is a top-down view of the belt support structure in FIG. 4.

FIG. 5 illustrates a top-down view of a plurality of tile elements 181 forming the belt support structure 180. For illustrative purpose a tile element 181 has been omitted. As seen in the top-down direction D3, the belt support structure 180 comprises a relatively large open area, through which the underlying suction chamber is visible. This results in a low air resistance of the belt support structure 180, which allows for a reduced load on the suction source. A further advantage is the removal of ink mist through the belt support structure. Ink mist originates from fine particles generated during the jetting of ink droplets. The particles float between the print head assembly 31 and the belt 74. The particles may contaminate the sheet and/or belt 74, which could result in visible artifacts on the sheet. The open belt support structure 180 allows at least a portion of the ink mist to be removed via the suction chamber 76 though uncovered portions of the belt 74, for example besides or between sheets on the belt 74. While the ink mist may contaminate the inside of the suction chamber 74, contact between the belt 74 and the belt support structure 180 is minimized and on the inside of the belt 74. It was further found that the plastic tile elements 181 are easy to clean and, if needed, can be quickly replaced by a new tile element 181. It was further found that with the above mentioned materials ink mist or ink particles do not or are less likely to adhere to the support beams 82, 182. This ensures that the support beams 82, 182 remain clean, which allows for a constant low friction support for the belt 74. In another embodiment, a cleaning device is provided at the belt 74 for removing pollution from the belt 74, specially from its inner surface. When applying the above mentioned materials, ink pollution is more likely to adhere to the belt 74 than to the support beams 82, 182. The belt 74 during operation cleans the support beams 82, 182 and is itself continuously cleaned by the cleaning device, which may be a scraper or wiper in contact with the inner surface of the belt 74. This improves the running time of the printer 1.

The open area of the structure 180 is preferably maximized by spacing the parallel support beams 182 apart from one another by at least twice, thrice, or four times their width in the lateral direction D2 Similarly, the connection bridges 184 are parallel to the lateral direction D2 to minimize their total area. The connection bridges 184 further are spaced apart from one another by a distance of at least twice, thrice, four times, or five times their width in the transport direction D1. The connection bridges 184 may further be positioned to overlap with the mounting rods 175, when viewed in the top-down direction D3. The tile elements 181 are preferably dimensioned to fit or fill the area of the top opening of the suction chamber 76. The length and/or of the open area of the suction chamber 76 is preferably a plurality of the length and/or width of an individual tile elements 181.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A conveyor for an inkjet printer, comprising:
   an endless, air permeable belt positioned at least partially over a suction chamber; and
   a belt support structure provided over the suction chamber,
   wherein the belt support structure comprises a plurality of longitudinal, narrow support beams directly contacting the belt and positioned spaced apart from one another and parallel to one another in a transport direction of the belt to define a flat support plane for the belt,
   wherein the belt support structure further comprises spaced apart connection bridges for connecting support beams to one another, the connection bridges extending perpendicular to the support beams in a lateral direction of the belt, and the connection bridges being positioned remote from the support plane, wherein the belt support structure is spaced apart from a bottom surface of the suction chamber, and wherein an opening is formed between neighboring support beams and neighboring connection bridges, wherein a combined area of the openings exceeds a combined area of the support beams and the connection bridges, when viewed perpendicular to the support plane.

2. The conveyor according to claim 1, wherein a length and/or width of the opening in the transport direction and/or the lateral direction exceeds a width of the connection bridges.

3. The conveyor according to claim 2, wherein the length and/or width of the opening in the transport direction and/or the lateral direction is at least three times the width of the connection bridges.

4. The conveyor according to claim 3, wherein a length and/or width of the opening in the transport direction and/or the lateral direction exceeds a width of the support beams.

5. The conveyor according to claim 4, wherein the connection bridges are oriented in the lateral direction.

6. The conveyor according to claim 5, wherein the belt support structure is formed of a plurality of identical tile elements, each tile element comprising a plurality of connection bridges and support beams.

7. The conveyor according to claim 6, wherein the tile elements are provided with corresponding locking means for interlocking the tile elements to one another.

8. The conveyor according to claim 7, wherein the suction chamber is provided with a plurality of rods extending parallel to the support plane, wherein the tile elements are provided with attachment means for attaching the tile elements on the rods.

9. The conveyor according to claim 8, wherein the support beams are formed of a plastic material.

10. The conveyor according to claim 9, wherein the belt is formed of a perforated plastic material.

11. The conveyor according to claim 8, wherein the suction chamber is positioned between a plurality of rollers for supporting and driving the belt, such that the belt surrounds the suction chamber.

12. The conveyor according to claim 8, wherein the plurality of rods are provided on a top side of the suction chamber spaced apart from a bottom surface of the suction chamber.

13. The conveyor according to claim 3, wherein the length and/or width of the opening in the transport direction and/or the lateral direction is at least two times the width of the support beams.

14. An inkjet printer comprising the conveyor according to claim 1.

15. The inkjet printer according to claim 14, wherein the conveyor is configured for transporting sheets of print media along a page-wide printhead array.

* * * * *